United States Patent
Zhao et al.

(10) Patent No.: US 9,224,416 B2
(45) Date of Patent: *Dec. 29, 2015

(54) NEAR FIELD TRANSDUCERS INCLUDING NITRIDE MATERIALS

(71) Applicant: SEAGATE TECHNOLOGY LLC, Cupertino, CA (US)

(72) Inventors: Tong Zhao, Eden Prairie, MN (US); Sarbeswar Sahoo, Shakopee, MN (US); Michael Christopher Kautzky, Eagan, MN (US); Amit Vasant Itagi, Hugo, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/795,634

(22) Filed: Mar. 12, 2013

(65) Prior Publication Data
US 2013/0279315 A1 Oct. 24, 2013

Related U.S. Application Data

(60) Provisional application No. 61/637,696, filed on Apr. 24, 2012.

(51) Int. Cl.
| | | |
|---|---|---|
| *G11B 11/00* | (2006.01) | |
| *G11B 13/08* | (2006.01) | |
| *G11B 13/04* | (2006.01) | |
| *G11B 5/31* | (2006.01) | |
| *G11B 5/60* | (2006.01) | |

(Continued)

(52) U.S. Cl.
CPC ............... *G11B 13/08* (2013.01); *G11B 5/314* (2013.01); *G11B 5/3106* (2013.01); *G11B 5/4866* (2013.01); *G11B 5/6088* (2013.01); *G11B 13/04* (2013.01); *G11B 2005/0021* (2013.01)

(58) Field of Classification Search
CPC .................. G11B 13/04; G11B 5/1278; G11B 2005/0021; G11B 13/08; G11B 5/314; G11B 5/3133; G11B 5/6088; G11B 5/858; G11B 5/851; G11B 5/84; G11B 5/85; G11B 5/1387; G11B 5/3106
USPC .......... 369/13.33, 13.02, 13.32, 13.24, 13.14, 369/13.22, 112.27, 112.23; 360/59, 125.74
See application file for complete search history.

(56) References Cited

U.S. PATENT DOCUMENTS

| | | |
|---|---|---|
| 4,492,873 A | 1/1985 | Dmitriev |
| 5,482,611 A | 1/1996 | Helmer |

(Continued)

FOREIGN PATENT DOCUMENTS

| | | |
|---|---|---|
| EP | 024088 | 10/1987 |
| EP | 0 580 368 A2 | 1/1994 |

(Continued)

OTHER PUBLICATIONS

Al-Bayati et al., Junction Profiles of Sub keV Ion Implantation for Deep Sub-Quarter Micron Devices, *IEEE*, 2000, pp. 87-90.

(Continued)

*Primary Examiner* — Ali Neyzari
(74) *Attorney, Agent, or Firm* — Mueting, Raasch & Gebhardt, P.A.

(57) ABSTRACT

An apparatus that includes a near field transducer, the near field transducer including an electrically conductive nitride.

20 Claims, 5 Drawing Sheets

(51) Int. Cl.
  G11B 5/48    (2006.01)
  G11B 5/00    (2006.01)

(56)  References Cited

U.S. PATENT DOCUMENTS

| | | | |
|---|---|---|---|
| 5,849,093 A | 12/1998 | Andra | |
| 5,945,681 A | 8/1999 | Tokiguchi | |
| 6,130,436 A | 10/2000 | Renau | |
| 6,144,098 A | 11/2000 | Iyer | |
| 6,589,676 B1 | 7/2003 | Gui | |
| 6,632,483 B1 | 10/2003 | Callegari | |
| 6,641,932 B1 | 11/2003 | Xu | |
| 6,683,426 B1 | 1/2004 | Kleeven | |
| 6,795,630 B2 | 9/2004 | Challener | |
| 6,999,384 B2 | 2/2006 | Stancil | |
| 7,002,228 B2 | 2/2006 | Deak | |
| 7,018,729 B2 | 3/2006 | Pocker | |
| 7,032,427 B2 | 4/2006 | Niwa | |
| 7,262,936 B2* | 8/2007 | Hamann et al. | 360/128 |
| 7,272,079 B2 | 9/2007 | Challener | |
| 7,330,404 B2 | 2/2008 | Peng | |
| 7,476,855 B2 | 1/2009 | Huang | |
| 7,544,958 B2 | 6/2009 | Low | |
| 7,609,003 B2 | 10/2009 | Horsky | |
| 7,690,009 B2 | 3/2010 | Miyanishi et al. | |
| 7,791,839 B2 | 9/2010 | Olson | |
| 7,961,417 B2 | 6/2011 | Seigler | |
| 7,965,464 B2 | 6/2011 | Batra | |
| 7,986,592 B2* | 7/2011 | Hirano et al. | 369/13.24 |
| 8,023,225 B2 | 9/2011 | Shimazawa | |
| 8,031,561 B2 | 10/2011 | Hellwig | |
| 8,040,761 B2 | 10/2011 | Kawamori | |
| 8,077,556 B2* | 12/2011 | Komura et al. | 369/13.02 |
| 8,107,325 B2 | 1/2012 | Komura et al. | |
| 8,116,034 B2 | 2/2012 | Komura | |
| 8,116,176 B2 | 2/2012 | Kato | |
| 8,194,510 B2 | 6/2012 | Sasaki | |
| 8,194,511 B2* | 6/2012 | Sasaki et al. | 369/13.33 |
| 8,213,272 B2 | 7/2012 | Takayama | |
| 8,223,597 B2 | 7/2012 | Komura | |
| 8,248,891 B2 | 8/2012 | Lee | |
| 8,284,521 B2 | 10/2012 | Ohtsu | |
| 8,284,635 B2 | 10/2012 | Matsumoto | |
| 8,289,650 B2* | 10/2012 | Seigler et al. | 360/125.3 |
| 8,320,220 B1* | 11/2012 | Yuan et al. | 369/13.33 |
| 8,331,205 B2* | 12/2012 | Seigler et al. | 369/13.32 |
| 8,339,740 B2* | 12/2012 | Zou et al. | 360/125.31 |
| 8,351,151 B2 | 1/2013 | Katine | |
| 8,385,159 B2 | 2/2013 | Gao | |
| 8,400,902 B2 | 3/2013 | Huang | |
| 8,405,056 B2 | 3/2013 | Amaldi | |
| 8,405,932 B2 | 3/2013 | Seigler et al. | |
| 8,416,647 B1 | 4/2013 | Zhao | |
| 8,427,925 B2* | 4/2013 | Zhao et al. | 369/112.23 |
| 8,451,555 B2* | 5/2013 | Seigler et al. | 360/59 |
| 8,477,454 B2 | 7/2013 | Zou | |
| 8,514,673 B1* | 8/2013 | Zhao et al. | 369/13.33 |
| 8,553,505 B2 | 10/2013 | Rawat | |
| 8,670,215 B2 | 3/2014 | Zou | |
| 8,711,662 B2 | 4/2014 | Lee | |
| 8,733,959 B2 | 5/2014 | Moriya | |
| 8,830,800 B1 | 9/2014 | Pitcher | |
| 8,842,391 B2* | 9/2014 | Zou et al. | 360/125.31 |
| 8,971,161 B2* | 3/2015 | Cheng et al. | 369/13.33 |
| 2005/0012052 A1 | 1/2005 | Platzgummer | |
| 2005/0190496 A1 | 9/2005 | Hamann | |
| 2006/0238133 A1 | 10/2006 | Horsky | |
| 2007/0069383 A1 | 3/2007 | Suzuki | |
| 2008/0230724 A1 | 9/2008 | Low | |
| 2009/0073858 A1 | 3/2009 | Seigler | |
| 2009/0130365 A1 | 5/2009 | Kojima | |
| 2009/0225636 A1 | 9/2009 | Hirano | |
| 2010/0103553 A1 | 4/2010 | Shimazawa | |
| 2010/0123965 A1 | 5/2010 | Lee | |
| 2010/0123967 A1 | 5/2010 | Batra | |
| 2010/0128579 A1 | 5/2010 | Seigler | |
| 2010/0149930 A1 | 6/2010 | Komura | |
| 2010/0157746 A1 | 6/2010 | Hongo | |
| 2010/0190036 A1 | 7/2010 | Komvopoulos | |
| 2010/0214685 A1 | 8/2010 | Seigler | |
| 2010/0309581 A1 | 12/2010 | Wu | |
| 2010/0315736 A1 | 12/2010 | Takayama | |
| 2010/0320403 A1 | 12/2010 | Amaldi | |
| 2010/0329085 A1 | 12/2010 | Kawamori | |
| 2011/0006214 A1 | 1/2011 | Bonig | |
| 2011/0026161 A1 | 2/2011 | Ikeda | |
| 2011/0038236 A1 | 2/2011 | Mizuno | |
| 2011/0058272 A1 | 3/2011 | Miyauchi | |
| 2011/0096431 A1 | 4/2011 | Hellwig | |
| 2011/0122735 A1 | 5/2011 | Kato | |
| 2011/0205863 A1* | 8/2011 | Zhao et al. | 369/13.33 |
| 2012/0045662 A1 | 2/2012 | Zou | |
| 2012/0105996 A1 | 5/2012 | Katine | |
| 2012/0127839 A1 | 5/2012 | Rawat | |
| 2012/0213042 A1 | 8/2012 | Aoki | |
| 2013/0107679 A1 | 5/2013 | Huang | |
| 2013/0161505 A1 | 6/2013 | Pitcher | |
| 2013/0164453 A1 | 6/2013 | Pitcher | |
| 2013/0164454 A1 | 6/2013 | Pitcher | |
| 2013/0235707 A1* | 9/2013 | Zhao et al. | 369/13.29 |
| 2013/0279315 A1 | 10/2013 | Zhao | |
| 2013/0286799 A1* | 10/2013 | Zhu et al. | 369/13.02 |
| 2013/0286804 A1* | 10/2013 | Zhao et al. | 369/13.33 |
| 2013/0288077 A1 | 10/2013 | Dhawan | |
| 2014/0004384 A1 | 1/2014 | Zhao | |
| 2014/0043948 A1 | 2/2014 | Hirata | |
| 2014/0050057 A1 | 2/2014 | Zou | |
| 2014/0113160 A1 | 4/2014 | Pitcher | |
| 2015/0132503 A1 | 5/2015 | Kautzky | |

FOREIGN PATENT DOCUMENTS

| | | |
|---|---|---|
| EP | 0942072 | 9/1999 |
| EP | 1328027 | 7/2003 |
| EP | 2106678 | 10/2009 |
| JP | 2011198450 | 10/2011 |
| JP | 20111248991 | 12/2011 |
| TW | 200929183 | 7/2009 |
| WO | WO 97/45834 | 12/1997 |
| WO | WO 2013/163195 | 10/2013 |
| WO | WO 2013/163470 | 10/2013 |

OTHER PUBLICATIONS

Angel et al., "Enhanced Low Energy Drift-Mode Beam Currents in a High Current Ion Implanter," *IEEE*, 1999, pp. 219-222.
U.S. Appl. No. 13/923,925, Jun. 21 2013, Pitcher.
U.S. Appl. No. 14/062,651, Oct. 24, 2013, Zou.
Bannuru et al., "The Electrical and Mechanical Properties of Au-V and Au-V2O5 Thin Films for Wear-Resistant RF MEMS Switches", *Journal of Applied Physics*, 103, (2008), pp. 083522-1-083522-6.
Druz et al., "Diamond-Like Carbon Films Deposited Using a Broad, Uniform Ion Beam from an RF Inductively Coupled CH4-Plasma Source", Diamond and Related Materials, vol. 7, No. 7, Jul. 1998, pp. 965-972.
Liu et al., "Influence of the Incident Angle of Energetic Carbon Ions on the Properties of Tetrahedral Amorphous Carbon (ta-C) films", *Journal of Vacuum Science and Technology*, vol. 21, No. 5, Jul. 25, 2003, pp. 1665-1670.
Metallization: "Metallization"; chapter 5, In: *Kris v. Srikrishnan and Geraldine C. Schwartz*: "Handbook of Semiconductor Interconnection Technology, Second Edition", 2006, CRC Press, Boca Raton, FL, USA, XP002711255, ISBN:978-1-4200-1765-6, pp. 311-382, Section 5.4.1.2 Adhesion; p. 320.
Piazza et al., "Large Area Deposition of Hydrogenated Amorphous Carbon Films for Optical Storage Disks", Diamond and Related Materials, vol. 13, No. 4-8, Apr. 2004, pp. 1505-1510.
Robertson, J., "Diamond-Like Amorphous Carbon," *Materials Science and Engineering R 37*, 2002, pp. 129-281.
Satoh et al., "Evaluation of Adhesion Materials for Gold Line-and-Space Surface Plasmon Antenna on SOI-MOS Photodiode", Silicon Nanoelectronics Workshop (SNW), 2010, *IEEE*, Piscataway, NJ, USA, Jun. 13, 2010, pp. 1-2.

(56) References Cited

OTHER PUBLICATIONS

Vogt, K.W. et al., "Characterization of Thin Titanium Oxide Adhesion Layers on Gold Resistivity, Morphology, and Composition", *Surface Science*, North-Holland, Amsterdam, NL, vol. 301, No. 1-3, Jan. 10, 1994, pp. 203-213.

Williams, et al., "Strengthening Gold Films with Zirconia Nanoparticles for MEMS Electrical Contacts", *ScienceDirect*, Acta Materialia 56, (2008), pp. 1813-1819.

PCT/US2013/038120 Search Report and Written Opinion dated Jul. 19, 2013 (8 pages).

* cited by examiner

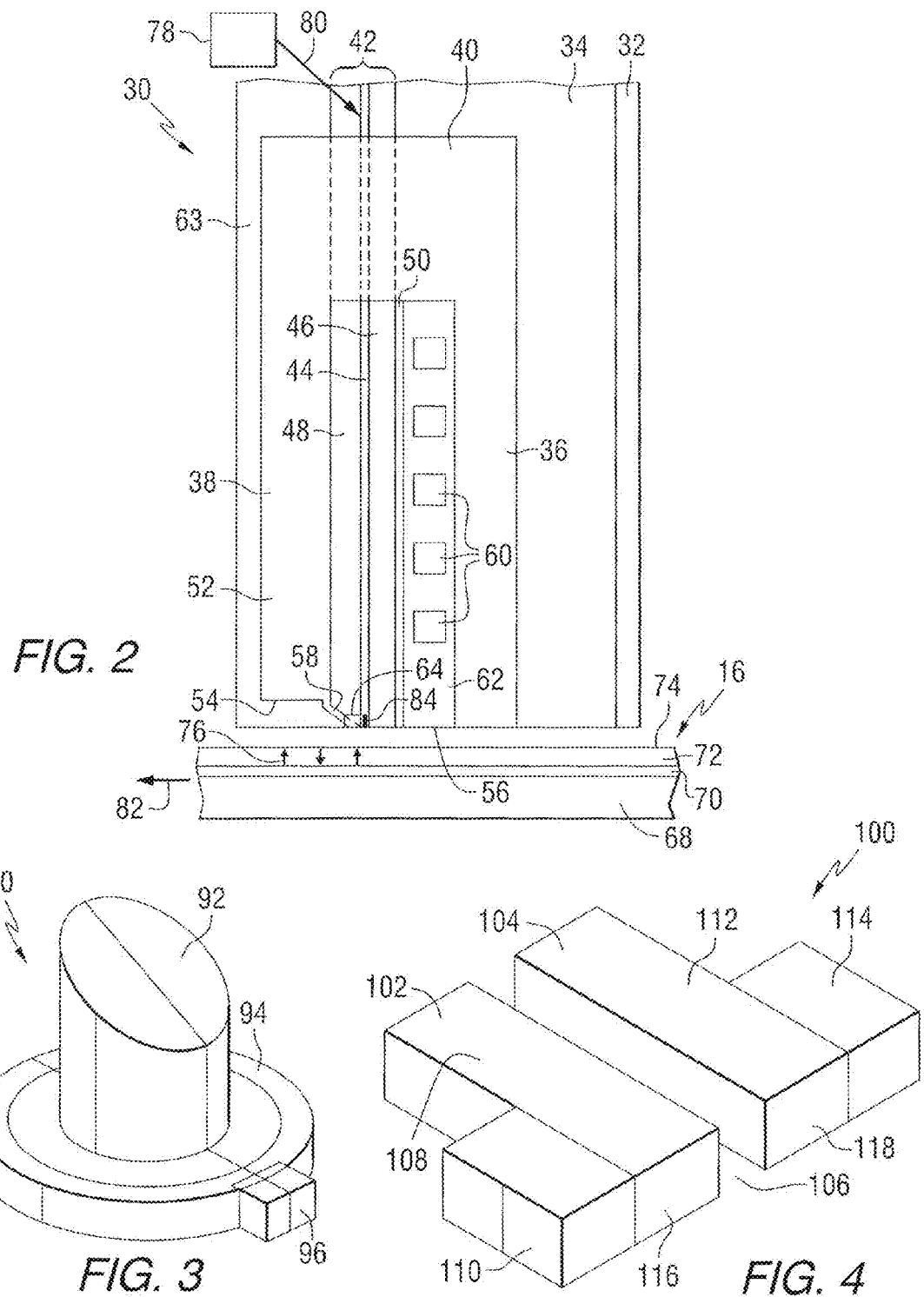

NEAR FIELD TRANSDUCERS INCLUDING NITRIDE MATERIALS

PRIORITY

This application claims priority to U.S. Provisional Application No. 61/637,696 entitled "NEAR FIELD TRANSDUCERS (NFTs) INCLUDING NITRIDES" having docket number 430.17123000 filed on Apr. 24, 2012, the disclosure of which is incorporated herein by reference thereto.

BACKGROUND

In heat assisted magnetic recording, information bits are recorded on a data storage medium at elevated temperatures, and the data bit dimension can be determined by the dimensions of the heated area in the storage medium or the dimensions of an area of the storage medium that is subjected to a magnetic field. In one approach, a beam of light is condensed to a small optical spot on the storage medium to heat a portion of the medium and reduce the magnetic coercivity of the heated portion. Data is then written to the reduced coercivity region.

One example of a recording head for use in heat assisted magnetic recording includes a near field transducer (NFT) that is capable of focusing light to a spot size smaller than the diffraction limit. The NFT is designed to reach local surface-plasmon resonance at a designed light wavelength. At resonance, a high electric field surrounding the NFT appears, due to the collective oscillation of electrons in the metal. A portion of the field will tunnel into a storage medium and get absorbed, raising the temperature of the medium locally for recording.

The NFT's temperature significantly increases at plasmonic resonance. In addition, a portion of the NFT may be exposed at the air bearing surface of the recording head and is thus subject to mechanical wearing. NFT performance is greatly influenced by the heat and mechanical stress during HAMR operation. Gold (Au) is currently used as the primary NFT material due to its superior optical properties. However, gold has a relatively low mechanical strength and gold NFTs may experience reflow at elevated temperatures resulting in rounding of the NFT shape. A deformation in shape can reduce coupling efficiency and reduce the amount of light energy transferred to the storage medium. Therefore, there remains a need for NFTs made of materials other than gold.

SUMMARY

Disclosed herein is an apparatus that includes a near field transducer, the near field transducer including an electrically conductive nitride.

Also disclosed is an apparatus that includes a light source; a waveguide; and a near field transducer, the near field transducer including an electrically conductive nitride, wherein the light source, waveguide and near field transducer are configured to transmit light from the light source to the waveguide and finally the near field transducer.

Also disclosed is a disc drive that includes at least one actuator arm having a flexure; at least one head, wherein each flexure has a head at the distal end thereof and wherein each head includes: a light source; a near field transducer, the near field transducer including an electrically conductive nitride; a magnetic reader; and a magnetic writer wherein the light source and the near field transducer are configured to transmit light from the light source to the near field transducer in order to assist the magnetic writer with writing.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

FIG. 2 is a side elevation view of a recording head constructed in accordance with an aspect of the invention.

FIG. 3 is a schematic representation of a near field transducer.

FIG. 4 is a schematic representation of another near field transducer.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

In one aspect, this disclosure provides a near field transducer (NFT) that can be used in a HAMR recording head. Disclosed NFTs include materials that may show advantageous mechanical properties as well as decreased thermal mismatch with adjacent materials, while still possessing acceptable optical properties. In several examples, such materials include nitrides.

Figure 1:
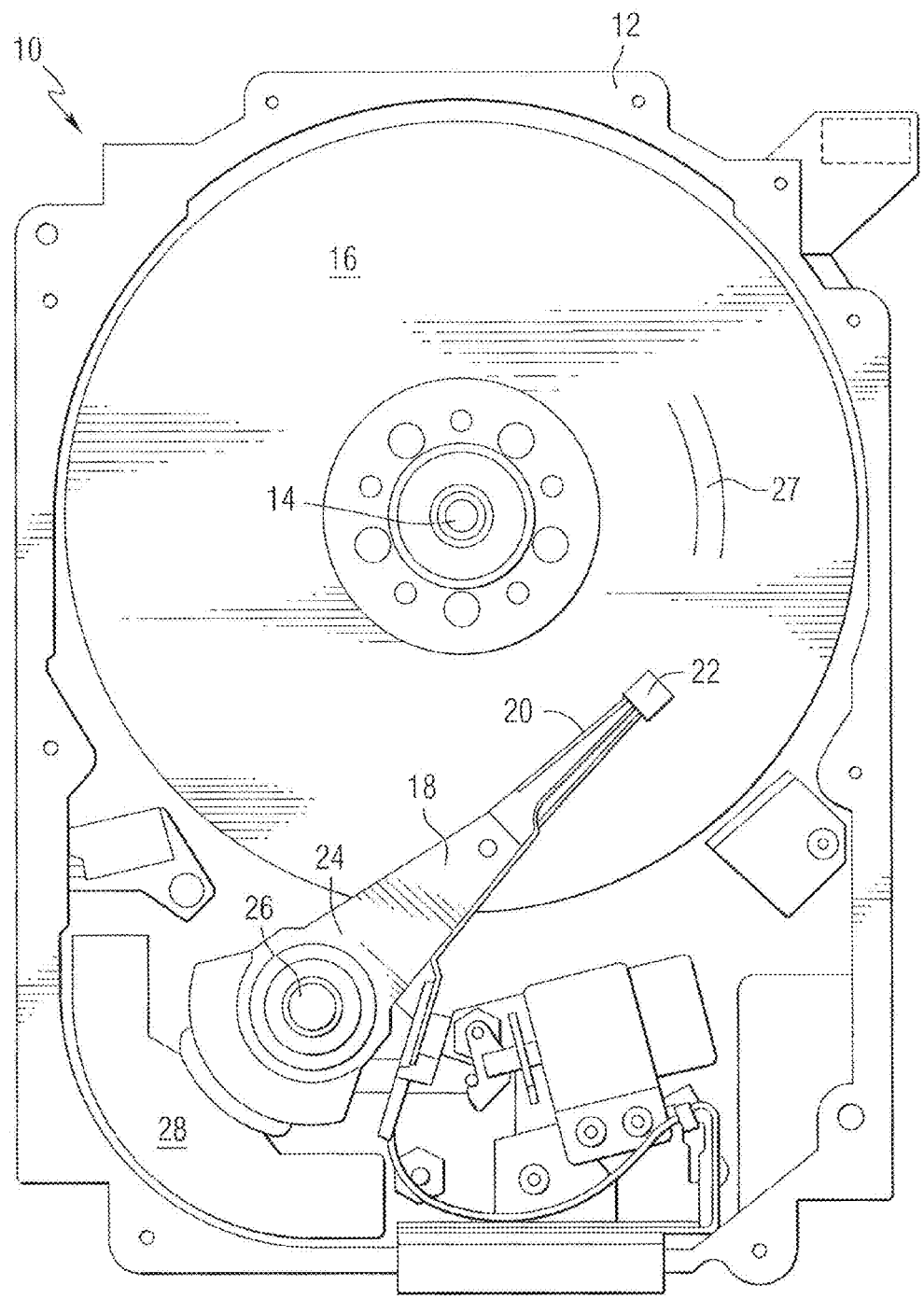
FIG. 1 is a pictorial representation of a data storage device in the form of a disc drive that can include a recording head constructed in accordance with an aspect of this disclosure.

Disclosed herein are NFTs and devices that include such NFTs. FIG. 1 is a pictorial representation of a data storage device in the form of a disc drive 10 that can utilize disclosed NFTs. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art. The storage media may include, for example, continuous media or bit patterned media.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light toward the storage media and a near field transducer to focus the light to a spot size smaller than the diffraction limit. While FIG. 1 shows a disc drive, disclosed NFTs can be utilized in other devices that include a near field transducer.

FIG. 2 is a side elevation view of a recording head that may include a disclosed NFT; the recording head is positioned near a storage media. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole. A heat sink 64 is positioned adjacent to the sloped pole piece 58. The heat sink can be comprised of a non-magnetic material, such as for example Au.

As illustrated in FIG. 2, the recording head 30 includes a structure for heating the magnetic storage media 16 proximate to where the write pole 58 applies the magnetic write field H to the storage media 16. In this example, the media 16 includes a substrate 68, a heat sink layer 70, a magnetic recording layer 72, and a protective layer 74. However, other types of media, such as bit patterned media can be used. A magnetic field H produced by current in the coil 60 is used to control the direction of magnetization of bits 76 in the recording layer of the media.

The storage media 16 is positioned adjacent to or under the recording head 30. The waveguide 42 conducts light from an energy source 78 of electromagnetic radiation, which may be, for example, ultraviolet, infrared, or visible light. The source may be, for example, a laser diode, or other suitable laser light source for directing a light beam 80 toward the waveguide 42. Specific exemplary types of energy sources 78 can include, for example laser diodes, light emitting diodes (LEDs), edge emitting laser diodes (EELs), vertical cavity surface emitting lasers (VCSELs), and surface emitting diodes. In some embodiments, the energy source can produced energy having a wavelength from 300 nm to 2000 nm. In some embodiments, the energy source can produce energy having a wavelength of 830 nm, for example. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82. A near-field transducer (NFT) 84 is positioned in or adjacent to the waveguide and at or near the air bearing surface. The heat sink material may be chosen such that it does not interfere with the resonance of the NFT.

Although the example of FIG. 2 shows a perpendicular magnetic recording head and a perpendicular magnetic storage media, it will be appreciated that the disclosure may also be used in conjunction with other types of recording heads and/or storage media where it may be desirable to concentrate light to a small spot.

FIG. 3 is a schematic view of a lollypop NFT 90 in combination with a heat sink 92. The NFT includes a disk shaped portion 94 and a peg 96 extending from the disk shaped portion. The heat sink 92 can be positioned between the disk shaped portion and the sloped portion of the top pole in FIG. 2. When mounted in a recording head, the peg may be exposed at the ABS and thus can be subjected to mechanical wearing.

FIG. 4 is a schematic view of a coupled nanorod (CNR) NFT 100. This NFT includes two nanorods 102 and 104 separated by a gap 106. Nanorod 102 includes a first portion 108 and a second portion 110. Nanorod 104 includes a first portion 112 and a second portion 114. When mounted in a recording head, the ends 116 and 118 of the nanorods may be exposed at the ABS and thus be subject to mechanical wearing.

FIGS. 3 and 4 show example NFTs. However, the disclosure is not limited to any particular type of NFT. The materials described below may be used in various NFT configurations.

When used in a recording head, NFTs may have an end positioned at or near the air bearing surface.

Materials that are to be used in disclosed NFTs generally are plasmonic materials. The plasmonic nature of a material can be estimated based on the refractive index (n) and the extinction coefficient (k). Table I shows optical properties (n and k), thermal conductivity and coefficient of thermal expansion (CTE) for various materials. Table I also provides a figure of merit (FOM) for surface plasmon generation (($n^2-k^2$)/2nk).

TABLE I

Optical Properties of Various Materials

| Material | n @ 830 nm | k @ 830 nm | FOM ($n^2 - k^2$)/2nk |
|---|---|---|---|
| Ag | 0.15 | 5.52 | −18.39 |
| Au | 0.19 | 5.42 | −14.25 |
| Cu | 0.26 | 5.29 | −10.15 |
| TiN | 0.99 | 3.60 | −1.68 |
| ZrN | 0.88 | 4.55 | −2.50 |
| Ta | 1.09 | 3.75 | −1.57 |
| Al | 2.72 | 8.29 | −1.36 |
| Rh | 2.78 | 6.97 | −1.05 |
| Pd | 2.09 | 5.22 | −1.05 |
| Ir | 2.65 | 5.39 | −0.77 |
| Co | 2.54 | 4.91 | −0.71 |
| Pt | 2.93 | 5.08 | −0.58 |
| Fe | 2.94 | 3.41 | −0.15 |
| Ti | 2.99 | 3.32 | −0.10 |
| Mo | 3.53 | 3.30 | 0.07 |
| V | 3.47 | 3.18 | 0.09 |
| W | 3.48 | 2.79 | 0.22 |
| Ru | 4.98 | 3.88 | 0.25 |

As seen from Table 1, the currently measured properties for ZrN and TiN are only lower than those of Ag, Au, and Cu, and are therefore favorable candidates among all alternative plasmonic materials considered. Furthermore, the deposition processes of ZrN and TiN can be affected in order to improve the optical properties. Table II below shows nanoindentation hardness and coefficient of thermal expansion (CTE) of various materials.

TABLE II

Hardness and CTE of Various Materials

| Material | Nanoindentation Hardness (GPa) | Coefficient of Thermal Expansion (×$10^{-6}$/K) |
|---|---|---|
| AlO | — | 5 |
| SiO$_2$ | — | 3 |
| TaO | — | 6 |
| Au | ~2 | 14.2 |
| TiN | 18-21 | 9.35 |
| ZrN | 20-40 | 9.4 |

As seen from Table II, the nanoindentation hardness of ZrN is 20-40 GPa and that of Tin is 18-21 GPa. These values are an order of magnitude higher than that of Au (around 2 GPa). Furthermore, the CTE of ZrN (9.4×$10^{-6}$/K) and TiN (9.35×$10^{-6}$/K) are about 40% lower than that of Au and are closer to the oxide waveguide materials that surround the NFT. This could lead to lesser thermal stresses during HAMR operation.

Disclosed herein are NFTs that include an electrically conductive nitride material. Exemplary electrically conductive nitride materials can include, for example, ZrN, TiN, TaN, HfN, or combinations thereof. In some embodiments NFTs can include ZrN, TiN, or combinations thereof.

In some embodiments, the entire NFT can be made of a nitride material. In some embodiments, the entire NFT can be made of ZrN, TiN, or some combination thereof. In some embodiments, the NFT could be a lollypop type design, a nanorod type design, or any other type of NFT design. In some embodiments, a lollypop type NFT can be made entirely of a nitride material. In some embodiments, a nanorod type NFT can be made entirely of a nitride material.

In some embodiments, only a part of a NFT is made of a nitride material. In some embodiments, such a NFT could be a lollypop type design, a nanorod type design, or any other type of NFT design. In some embodiments, only the peg (see peg 96 in FIG. 3) of a NFT can be made of a nitride material and the remainder of the NFT (i.e., the disk shaped portion 94 in FIG. 3) can be made of a different material, for example, gold, silver, copper, or alloys thereof. Such an embodiment could improve the reliability of the NFT at the ABS due to superior thermo-mechanical properties of the nitride material over gold. Although there may be some coupling efficiency loss, the loss may be low and within an acceptable range due to the large disc surface area or volume which would still be gold.

Figure 5A:
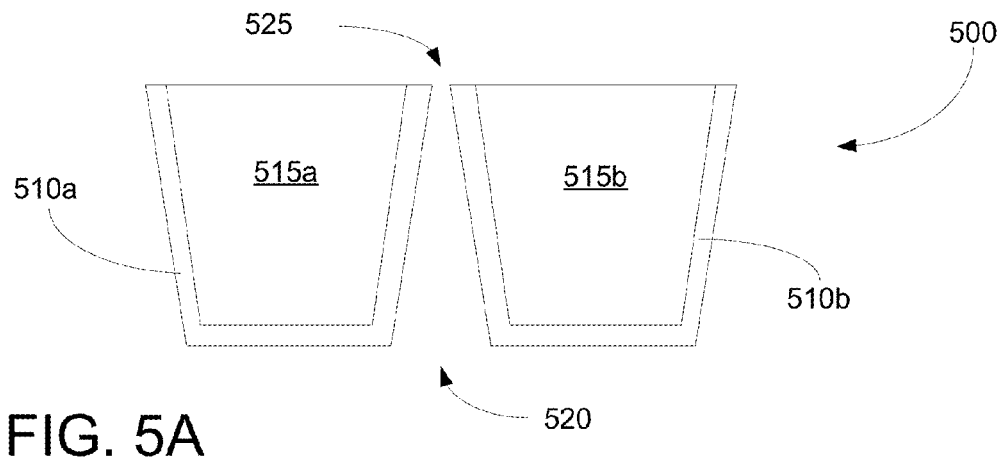
FIG. 5A depicts a schematic of a cross section of a disclosed NFT.

In some embodiments, only one or more portions of a NFT is made of a nitride material. An example of an NFT that could have one or more portions thereof made of a nitride material can include embodiments such as that depicted in FIG. 5A. The NFT 500 in FIG. 5A is a nanorod type NFT where each of the rods includes a nitride base layer 510a and 510b on the bottom 520 (opposite the top 525 of the NFT) of the individual rods of the NFT and a non-nitride core 515a and 515b. In some embodiments, the non-nitride cores 515a and 515b can be, for example, gold, silver, copper, or alloys thereof. In some embodiments, the nitride base layer 510a and 510b can have a thickness that is at least 5 Å. In some embodiments, the nitride base layer 510a and 510b can have a thickness that is from 1 Å to 20 Å.

Figure 5B:
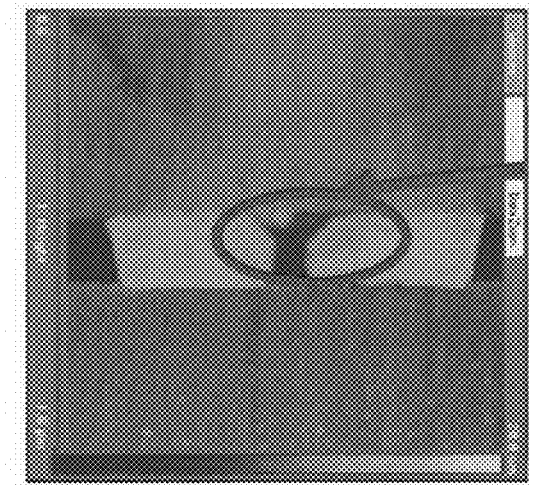
FIGS. 5B and 5C are an atomic force microscopy (AFM) image and a tunneling electron microscope (TEM) image of a previously utilized NFT that shows corner rounding.
Figure 5C:
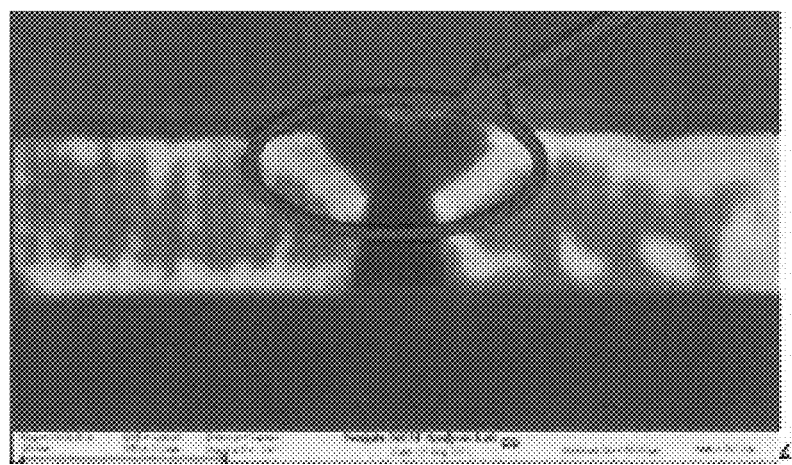

NFTs that include such nitride base layers can enhance mechanical properties of NFTs without significantly sacrificing the coupling efficiency. In some embodiments, such nitride base layers could function to reduce, minimize or eliminate corner rounding issues that have been seen in (for example) gold nanorod type NFTs. FIGS. 5B and 5C show atomic force microscopy (AFM) and tunneling electron microscope (TEM) images of gold nanorod type NFTs that show corner rounding. The location of the corner rounding appears to correlate with the location of the highest stress points at the corners of the rods (the gold/dielectric interface), as predicted by thermo-mechanical modeling. Embodiments such as that depicted in FIG. 5A may mitigate the corner rounding problem and should have reduced coupling efficiency penalties due to the relatively small amount of nitride material present in the overall NFT.

Figure 6:
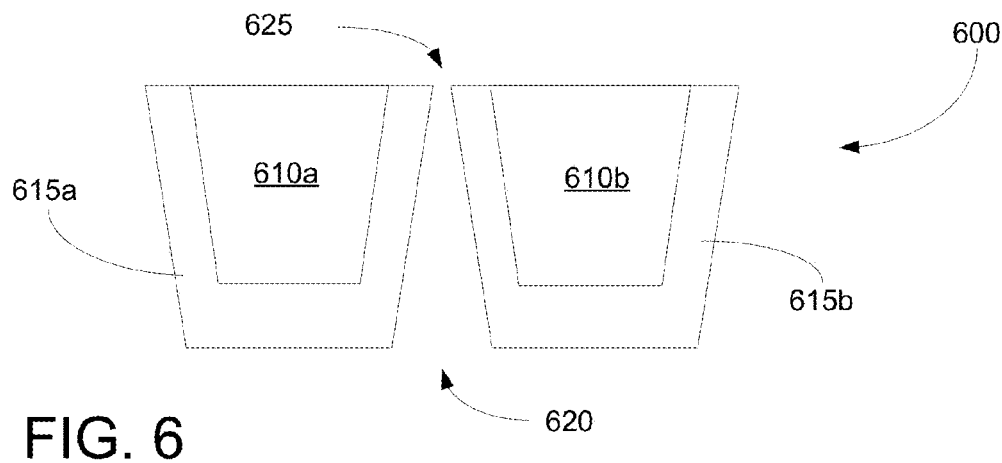
FIG. 6 depicts a schematic of a cross section of another disclosed NFT.

Another example of a NFT that could have one or more portions thereof made of a nitride material can include embodiments such as that depicted in FIG. 6. The NFT 600 in FIG. 6 is a nanorod type NFT where each of the rods includes a non-nitride base layer 615a and 615b on the bottom 620 (opposite the top 625 of the NFT) of the individual rods of the NFT and a nitride core 610a and 610b. In some embodiments, the non-nitride base layers 615a and 615b can be, for example, gold, silver, copper, or alloys thereof. In some embodiments, the non-nitride base layers 615a and 615b can have a thickness of at least 50 nm. In some embodiments, the non-nitride base layers 615a and 615b can have a thickness that is from 1 Å to 100 Å. an embodiment may provide advantages because it is thought that the bottom of the rods of the NFT are the plasmonically active portion of the NFT, and therefore having that region made of relatively more effective plasmonic materials (gold, silver, copper, or alloys thereof) can provide a NFT which has a very high coupling efficiency. Filling the rods (i.e., the nitride cores 610a and 610b) with a nitride material, which has a low CTE and low modulus could offer thermo-mechanical advantages. Such an embodiment could offer both higher coupling efficiency and better thermo-mechanical properties.

Figure 7A:
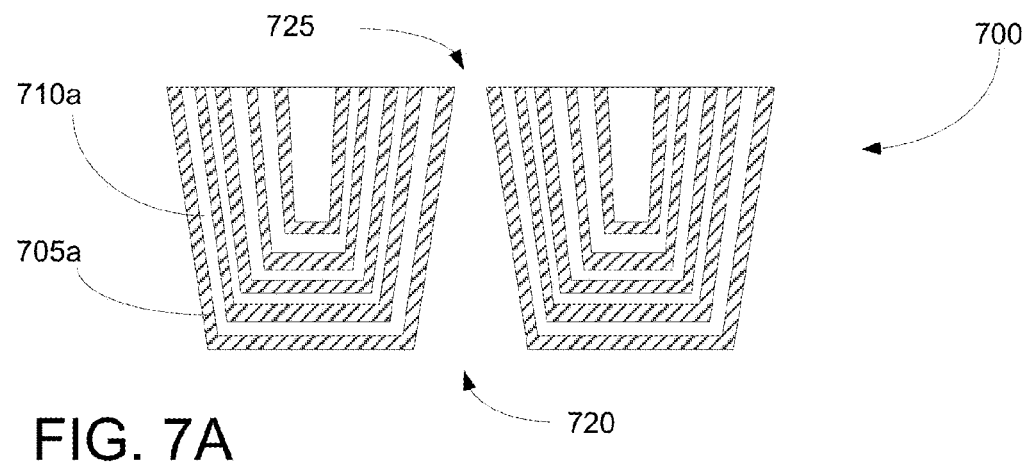
FIGS. 7A and 7B are schematic representations of cross sections of another disclosed near field transducer.
Figure 7B:
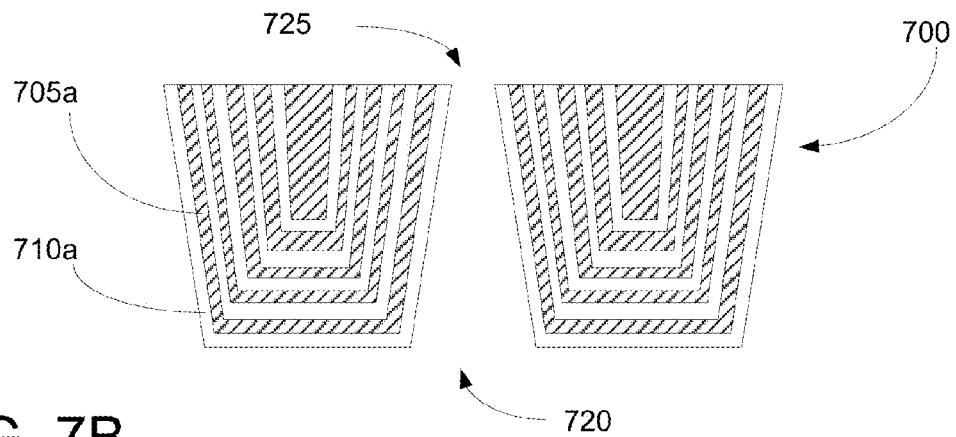

Another example of a NFT that could have one or more portions thereof made of a nitride material can include embodiments such as that depicted in FIGS. 7A and 7B. The NFT 700 depicted in FIG. 7A is a nanorod type NFT where each rod includes a multilayer structure of alternating nitride and non-nitride layers. The embodiment depicted in FIG. 7A includes alternating layers of nitride layers 705a and non-nitride layers 710a. In this embodiment, the nitride layers are the first layer on the bottom 720 (opposite the top 725 of the NFT) of the individual rods of the NFT. The embodiment depicted in FIG. 7B also includes alternating layers of non-nitride layers 710a and nitride layers 705a. In this embodiment, the non-nitride layers are the first layer on the bottom 720 of the individual rods of the NFT. In either of the embodiments depicted in FIGS. 7A and 7B, the non-nitride layers 710a can be, for example, gold, silver, copper, or alloys thereof. In some embodiments, there can be from 1 to 3000 sets of alternating layers of nitride and non-nitride materials. In some embodiments, there can be from 1 to 1000 sets of alternating layers of nitride and non-nitride materials. The individual layers in the NFT may, but need not, have the same thicknesses. Furthermore, any individual layer can have different thicknesses at different points, for example, the region along the bottom of a layer could be a different thickness than the regions along a side or sides of the NFT. In some embodiments, the individual layers can have thicknesses from 1 Å to 1000 Å. In some embodiments, the individual layers can have thicknesses from 1 Å to 100 Å. Such embodiments may offer a way of maximizing coupling efficiency and thermo-mechanical properties.

In some embodiments, an NFT can include a dispersed material in a base material. For example, a nitride material can be dispersed in a non-nitride material (base material) throughout at least a portion of the NFT. Or, for example, an NFT can include a non-nitride material dispersed in a nitride material (base material) throughout at least a portion of the NFT. In some embodiments, a material can be dispersed in a base material in the entirety of the NFT or only in some portion of the NFT. Such embodiments can be utilized with any type of NFT, including for example nanorod type NFTs and lollypop type NFTs. The material (either nitride or non-nitride) that is dispersed in the base material can be doped into the base material, for example. Similarly, the material that is dispersed in the base material can be in the form of nanoparticles. In some embodiments, the nanoparticles can have average diameters from 1 nm to 100 nm, for example. The dispersed material can be formed separately and then dispersed in the base material, or the dispersed material and the base material can be formed at the same time (for example, co-sputtering). In some embodiments, the non-nitride base materials can include, for example, gold, silver, copper, or alloys thereof.

EXAMPLES

Figure 8:
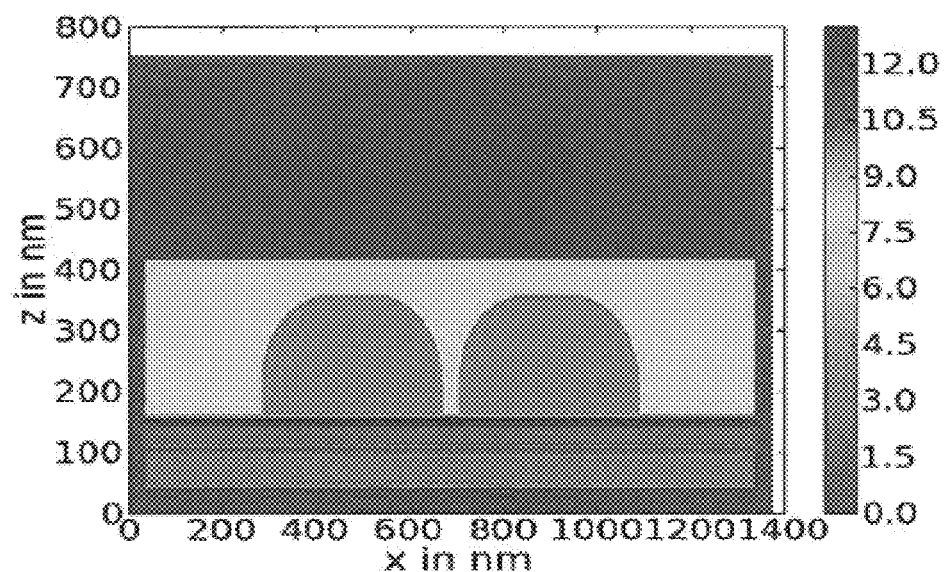
FIG. 8 shows a top down view of a disclosed exemplary device.
Figure 9:
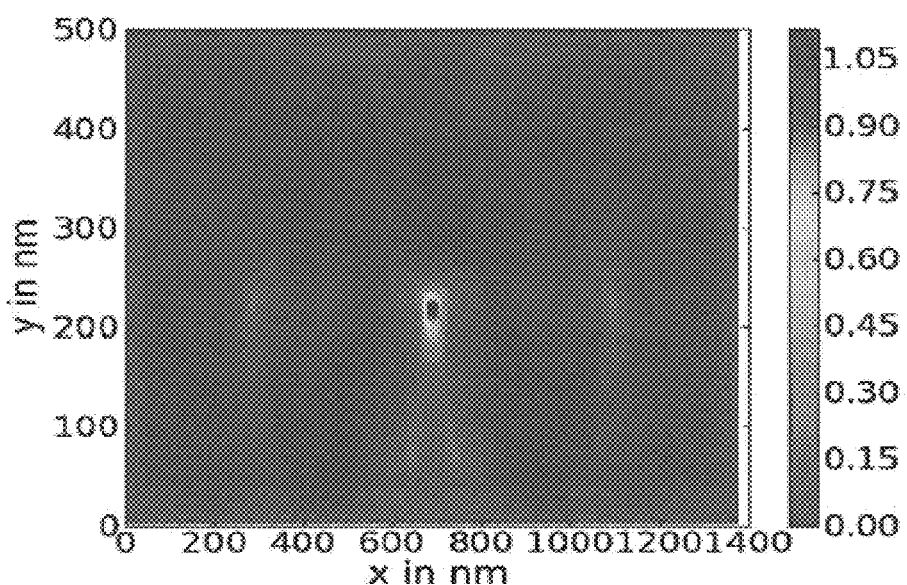
FIG. 9 shows the optical intensity in the media recording layer using a disclosed device.

A nanorod type NFT made entirely of TiN was modeled. The dimensions of the NFT (cross-track width and z height) were chosen with the properties of TiN in mind. FIG. 8 shows a top view of such a device, with the two half circles being the NFT regions. The optical intensity in the media recording layer is shown in FIG. 9. Modeling showed that the coupling efficiency for this design was approximately 30% that of a gold nanorod type NFT (CE=3.85% for Au and CE=1.10% for TiN). However, the acceptability of a NFT design is not entirely based on coupling efficiency; the superior thermo-mechanical properties of the TiN nanorod type NFT could be very beneficial. Similar results would be expected for a ZrN nanorod type NFT.

Growth of stoichiometric, crystalline, and low resistivity metallic TiN or ZrN has required high temperature processing in the past, for example up to about 800° C. using physical vapor deposition (PVD) methods such as direct current (DC) or reactive magnetron sputtering. Low resistivity TiN films have been produced at temperatures as low as about 200° C. by highly ionized sputter deposition techniques such as High Power Impulse Magnetron Sputtering (HiPIMS) power sources. TiN films having resistivity as low as 41.9 µΩ-cm have been obtained. Laser ablation deposition techniques have also been used to produce TiN and ZrN films at temperatures ranging from about 100° C. to about 600° C.

Thus, embodiments of near field transducers including nitride materials are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. An apparatus comprising:
   a near field transducer, the near field transducer comprising an electrically conductive nitride.

2. The apparatus according to claim 1, wherein the near field transducer comprises TiN, ZrN, TaN, HfN, or combinations thereof.

3. The apparatus according to claim 1, wherein the entire near field transducer comprises the electrically conductive nitride.

4. The apparatus according to claim 3, wherein the near field transducer includes only an electrically conductive nitride.

5. The apparatus according to claim 1, wherein the near field transducer has a peg and disc structure and only the peg comprises the electrically conductive nitride.

6. The apparatus according to claim 5, wherein the disc of the near field transducer comprises gold.

7. The apparatus according to claim 1, wherein the entire near field transducer consists essentially of TiN, ZrN TaN, HfN, or combinations thereof.

8. The apparatus according to claim 1 further comprising an energy source, the energy source producing energy having a wavelength from about 300 nm to about 2000 nm.

9. The apparatus according to claim 5, wherein only portions of the near field transducer comprise the electrically conductive nitride.

10. The apparatus according to claim 9, wherein the near field transducer comprises at least one layer of the electrically conductive nitride material.

11. The apparatus according to claim 10, wherein the at least one layer is on the bottom of the near field transducer.

12. The apparatus according to claim 10, wherein the near field transducer comprises a multilayer structure of the electrically conductive nitride and another plasmonic, non-nitride material.

13. The apparatus according to claim 1, wherein the electrically conductive nitride is dispersed throughout the near field transducer.

14. The apparatus according to claim 13, wherein the electrically conductive nitride is a dopant in another plasmonic, non-nitride material.

15. The apparatus according to claim 13, wherein another plasmonic, non-nitride material is a dopant in the electrically conductive nitride material.

16. An apparatus comprising:
   an energy source;
   a waveguide; and
   a near field transducer, the near field transducer comprising an electrically conductive nitride, wherein the energy source, waveguide and near field transducer are configured to transmit light from the energy source to the waveguide and finally the near field transducer.

17. The apparatus according to claim 16, wherein the near field transducer comprises TiN, ZrN, TaN, HfN, or combinations thereof.

18. The apparatus according to claim 16, wherein the near field transducer comprises TiN, ZrN, TaN, HfN, or combinations thereof; and a non-nitride material selected from Au, Ag, Cu, or alloys thereof.

19. A disc drive comprising:
   at least one actuator arm having a first end and a second end;
   at least one head, wherein each arm has a head at the first end thereof and wherein each head comprises:
      an energy source;
      a near field transducer, the near field transducer comprising an electrically conductive nitride;
      a magnetic reader; and
      a magnetic writer wherein the energy source and the near field transducer are configured to transmit light from the energy source to the near field transducer in order to assist the magnetic writer with writing.

20. The disc drive according to claim 19, wherein the near field transducer comprises TiN, ZrN, TaN, HfN, or combinations thereof; and a non-nitride material selected from Au, Ag, Cu, or alloys thereof.

* * * * *